(12) United States Patent
Huang et al.

(10) Patent No.: US 12,202,060 B2
(45) Date of Patent: Jan. 21, 2025

(54) MILLING MACHINE FLY-CUTTER WITH ADJUSTABLE CUTTING-TOOL GEOMETRIC ANGLE AND MILLING MACHINE

(71) Applicant: SHANDONG UNIVERSITY, Shandong (CN)

(72) Inventors: Chuanzhen Huang, Jinan (CN); Zhen Chen, Jinan (CN); Hanlian Liu, Jinan (CN); Hongtao Zhu, Jinan (CN); Bin Zou, Jinan (CN); Peng Yao, Jinan (CN); Jun Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 444 days.

(21) Appl. No.: 17/762,960

(22) PCT Filed: Apr. 12, 2021

(86) PCT No.: PCT/CN2021/086376
§ 371 (c)(1),
(2) Date: Mar. 23, 2022

(87) PCT Pub. No.: WO2022/188231
PCT Pub. Date: Sep. 15, 2022

(65) Prior Publication Data
US 2023/0166342 A1 Jun. 1, 2023

(30) Foreign Application Priority Data
Mar. 10, 2021 (CN) .......................... 202110261509.1

(51) Int. Cl.
*B23C 5/26* (2006.01)
(52) U.S. Cl.
CPC ........ *B23C 5/26* (2013.01); *B23C 2210/0407* (2013.01); *B23C 2210/54* (2013.01)

(58) Field of Classification Search
CPC ............ B23C 2260/48; B23C 2245/00; B23C 2210/66; B23C 2210/54;
(Continued)

(56) References Cited

U.S. PATENT DOCUMENTS

| 5,567,092 A | 10/1996 | Post |
| 5,667,343 A | 9/1997 | Hessman et al. |

FOREIGN PATENT DOCUMENTS

| CN | 202106078 U | | 1/2012 |
| CN | 102765139 A | * | 11/2012 |

(Continued)

OTHER PUBLICATIONS

Dec. 7, 2021 International Search Report issued in International Patent Application No. PCT/CN2021/086376.
(Continued)

*Primary Examiner* — Alan Snyder
*Assistant Examiner* — Eric Daniel Whitmire
(74) *Attorney, Agent, or Firm* — Oliff PLC

(57) ABSTRACT

A milling machine fly-cutter with adjustable cutting-tool geometric angle and milling machine includes a fly-cutter plate body, a plurality of combination grooves are evenly set in the circumferential direction of the fly-cutter plate body, and adjusting assemblies are mounted in the combination grooves. Wherein, the adjusting assemblies include an adjusting block for rake angle and relief angle, an adjusting block for tool cutting edge angle and minor cutting edge angle, an adjusting block for tool cutting edge inclination angle. A first side of the adjusting block is attached with a cutter handle, and a second side is connected with the adjusting block for rake angle and relief angle by the adjusting block for tool cutting edge angle and minor cutting edge angle. The milling machine fly-cutter realizes adjustment of the geometric angles of cutting tool, and is able to (Continued)

adapt to cutter handles of a variety of different specifications.

16 Claims, 3 Drawing Sheets

(58) Field of Classification Search
CPC ............. B23C 2210/0407; B23C 5/24; B23C 5/2489; B23C 5/08; B23C 5/006; B23B 2260/10; B23B 29/03403
See application file for complete search history.

(56) References Cited

FOREIGN PATENT DOCUMENTS

| | | | | | |
|---|---|---|---|---|---|
| CN | 105710981 | A | * | 6/2016 | ............. B28D 5/022 |
| DE | 4307630 | A1 | * | 10/1994 | ........... B23C 5/2489 |

OTHER PUBLICATIONS

Dec. 7, 2021 Written Opinion issued in International Patent Application No. PCT/CN2021/086376.

* cited by examiner

MILLING MACHINE FLY-CUTTER WITH ADJUSTABLE CUTTING-TOOL GEOMETRIC ANGLE AND MILLING MACHINE

TECHNICAL FIELD

The present invention relates to the field of cutting tools, in particular to a milling machine fly-cutter with adjustable cutting-tool geometric angle and milling machine.

BACKGROUND

Milling machine, as a machine tool, majorly performs workpiece processing with milling cutter. The milling cutter is a rotary cutting tool with single-tooth or multi-tooth used in milling. During milling, the milling cutter rotation is the main motion, and the movement of the workpiece or the milling cutter is the feed motion. Therefore, each tooth of the milling cutter intermittently removes in sequence the machining allowance of the workpiece. The milling machine has a wide range of processes and produces various planes (horizontal, vertical or inclined surfaces), grooves (keyways, T-slots, spiral grooves, etc.), side set parts and spiral surfaces. Milling machines employ multiple cutting-edge tools for interrupted cutting at high cutting speed and have the ability to mill wider surfaces. Therefore, the milling machine shows high productivity and produces surfaces with good quality, which is widely used in mechanical manufacturing. Milling machine fly-cutter can be mounted on the milling machine to mill larger planes, and is particularly suitable for large plane processing that requires no overlapping tool marks. In addition, fly-cutter of double cutter heads with the combination of roughing milling cutter head and finishing milling cutter head is often used in the processing of workpieces with large machining allowances and high surface quality requirements, greatly shortening the processing cycle and improving the processing quality.

During cutting process, cutting force, cutting temperature, cutting vibration, chip morphology and tool wear are directly related with the geometric angle of the cutting tool. Therefore, the cutting tool geometric angle affects the tool life, machining quality, productivity and production costs. The magnitude of the rake angle determines the sharpness and strength of the cutting edge. The major function of the relief angle is to reduce the friction between the flank surface of the cutting tool and the cutting surface during cutting. The magnitude of the tool cutting edge angle not only adjusts the ratio of axial force and radial force, but also improves cutting vibration, and also affects the strength and heat dissipation conditions of the tool nose. The major function of the minor cutting edge angle is to reduce the friction between the minor flank surface and the machined surface of the workpiece. The tool cutting edge inclination angle not only controls the chip flow direction, but also affects the strength of the tool nose and the position of the impact on the cutting edge during interrupted cutting, and also affects the sharpness of the cutting edge. Therefore, in the case of invariant tool material and tool structure, the cutting tool geometric angle exerts a profound impact on the cutting performance of the cutting tool. Reasonably choosing of tool geometric angle enables the full play to the cutting performance of the cutting tool and improving productivity to a large extent.

At present, the cutting tool is installed on the fly-cutter plate with a certain geometric angle, which is not able to achieve simultaneous adjustment of geometric angles of cutting tool, namely the rake angle, the relief angle, the tool cutting edge angle, the minor cutting edge angle and the tool cutting edge inclination angle. Therefore, it is difficult to give full play to the cutting performance of the tool. In addition, the existing milling machine fly-cutter plate can only be installed with a cutter handle of single specific specification, reducing its compatibility.

SUMMARY

In view of deficiencies in the prior art, the present invention provides a milling machine fly-cutter with adjustable cutting-tool geometric angle and milling machine, which can not only adjust tool geometric angles including rake angle, relief angle, tool cutting edge angle, minor cutting edge angle and tool cutting edge inclination angle, but also adapt to cutter handles of different specifications.

To achieve the above purpose, the present invention is realized by the following technical solutions:

In a first aspect, embodiments of the present invention provide a milling machine fly-cutter with adjustable tool geometric angles comprising a fly-cutter plate body. A plurality of combination grooves is evenly set in a circumferential direction of the fly-cutter plate body, and adjusting assemblies are mounted in the combination grooves;

wherein, the adjusting assemblies include an adjusting block for rake angle and relief angle, an adjusting block for tool cutting edge angle and minor cutting edge angle, and an adjusting block for tool cutting edge inclination angle. A first side of the adjusting block for tool cutting edge inclination angle is attached with a cutter handle, and a second side of the adjusting block for tool cutting edge inclination angle is connected with the adjusting block for rake angle and relief angle by the adjusting block for tool cutting edge angle and minor cutting edge angle.

As a further embodiment, a first side of the adjusting block for rake angle and relief angle is fitted with the combination groove, and a second side of the adjusting block for rake angle and relief angle is set with a first mounting groove for mounting the adjusting block for tool cutting edge angle and minor cutting edge angle.

As a further embodiment, a plurality of mating grooves are provided on a first side of the first mounting groove, and the mating grooves are provided with adjusting grooves for tool cutting edge angle and minor cutting edge angle.

As a further embodiment, a cross-section of the combination grooves is formed by the joint connection of a V-shaped section and a circular arc section.

As a further embodiment, a first side surface of the adjusting block for tool cutting edge angle and minor cutting edge angle is fitted with the first mounting groove, and a second side of the adjusting block for tool cutting edge angle and minor cutting edge angle is provided with a second mounting groove used for mounting the adjusting block for tool cutting edge inclination angle.

An end of the adjusting block for tool cutting edge angle and minor cutting edge angle is provided with a second positioning hole, and a first positioning hole corresponding to the second positioning hole is provided on one side of the adjusting block for rake angle and relief angle.

As a further embodiment, both sides of the second positioning hole are provided with threaded holes, and the threaded holes are connected with the adjusting groove for tool cutting edge angle and minor cutting edge angle by fasteners.

As a further embodiment, a first side of the adjusting block for tool cutting edge inclination angle corresponding to the second mounting groove is provided with an adjusting groove for tool cutting edge inclination angle connected with the second mounting groove by the fasteners. A second side of the adjusting groove for tool cutting edge inclination angle is provided with a tool sliding groove and a plurality of magnets are arranged in the tool sliding groove.

As a further embodiment, surfaces of the adjusting block for rake angle and relief angle, the adjustment block for tool cutting edge angle and minor cutting edge angle and the adjusting block for tool cutting edge inclination angle are all provided with graduated scales.

As a further embodiment, a bottom end face of the fly-cutter plate body is provided with a counterbore, a top end face of the fly-cutter plate body is provided with a positioning groove, and a center of the fly-cutter plate body is provided with a central positioning hole.

In a second aspect, an embodiment of the present invention also provides a milling machine using the milling machine fly-cutter.

The beneficial effects of the above embodiments of the present invention are as follows:

(1) In one or more embodiments of the present invention, through the concerted work of the adjusting block for rake angle and relief angle, the adjusting block for tool cutting edge angle and minor cutting edge angle and the adjusting block for tool cutting edge inclination angle mounted on the fly-cutter plate body, the geometric angles of cutting tool can be adjusted simultaneously, including the rake angel, the relief angle, the tool cutting edge angle, the minor cutting edge angle and the tool cutting edge inclination angle. This is helpful to give full play to the cutting performance of the tool under different working conditions, and to study the influence law and mechanism of different tool geometric angles on tool life, tool wear and machined surface integrity.

(2) In one or more embodiments of the present invention, through matching with the adjusting cushion block of the corresponding specifications in the tool sliding groove, the cutter handles of different specifications can be installed compatibly, which improves the versatility of the milling machine fly-cutter plate. In addition, the overhang length of the cutter handle in the tool sliding groove is adjustable, that is, the diameter of the cutter plate is variable, extending the processing range of the cutting tool and realizing the processing of large planes without overlapping tool marks.

(3) The milling machine fly-cutter of one or more embodiments of the present invention can be installed with multiple cutting-tools for milling at the same time, which can cut multiple times in one rotation stroke, so as to improve the machining efficiency.

DETAILED DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
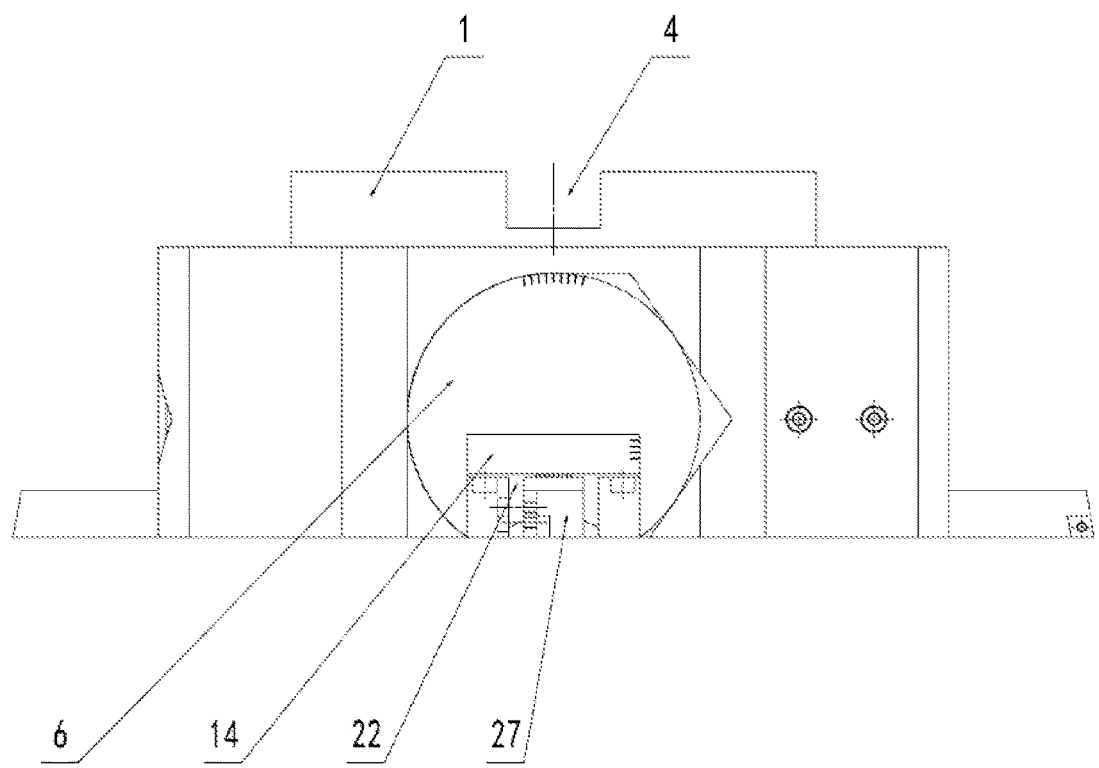
FIG. 1 is a front view of the present invention according to one or more embodiments.

wherein, 1—fly-cutter plate body, 2—counterbore, 3—positioning hole, 4—positioning groove, 5—combination groove, 6—adjusting block for rake angle and relief angle, 7—first fastener, 8—first through hole, 9—first threaded hole, 10—second fastener, 11—second through hole, 12—second threaded hole, 13—first mounting groove, 14—adjustment block for tool cutting edge angle and minor cutting edge angle, 15—third fastener, 16—first positioning hole, 17—second positioning hole, 18—mating groove, 19—adjusting groove for tool cutting edge angle and minor cutting edge angle, 20—third threaded hole, 21—second mounting groove, 22—adjusting block for tool cutting edge inclination angle, 23—fourth fastener, 24—adjusting groove for cutting edge inclination angle, 25—fourth threaded hole, 26—tool sliding groove, 27—cutter handle, 28—fifth fastener, 29—magnet, 30—fifth threaded hole, 31—adjusting cushion block, 32—graduated scale.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

For convenience of description, the "above", "below", "left", and "right" only indicate directions consistent with those of the accompanying drawings, are not intended to limit the structure, and are used only for ease and brevity of illustration and description, rather than indicating or implying that the mentioned device or element must have a particular orientation or must be constructed and operated in a particular orientation. Therefore, such terms should not be construed as a limitation on the present invention. In addition, the terms "first", "second" are merely used for describing purposes, and should not be construed as indicating or implying relative importance.

Explanation of terms: the terms "installed", "jointed", "connected", "fixed" and other terms in this application shall be understood in a broad sense. For example, they can be fixed connection, removable connection or integrated. They can be directly connected or indirectly connected through an intermediate medium. They can be the internal connection of two elements, or the interaction relationship between two elements. For those skilled in the art, the specific meaning of the above terms in the invention can be understood according to the specific situation.

Example 1

Figure 2:
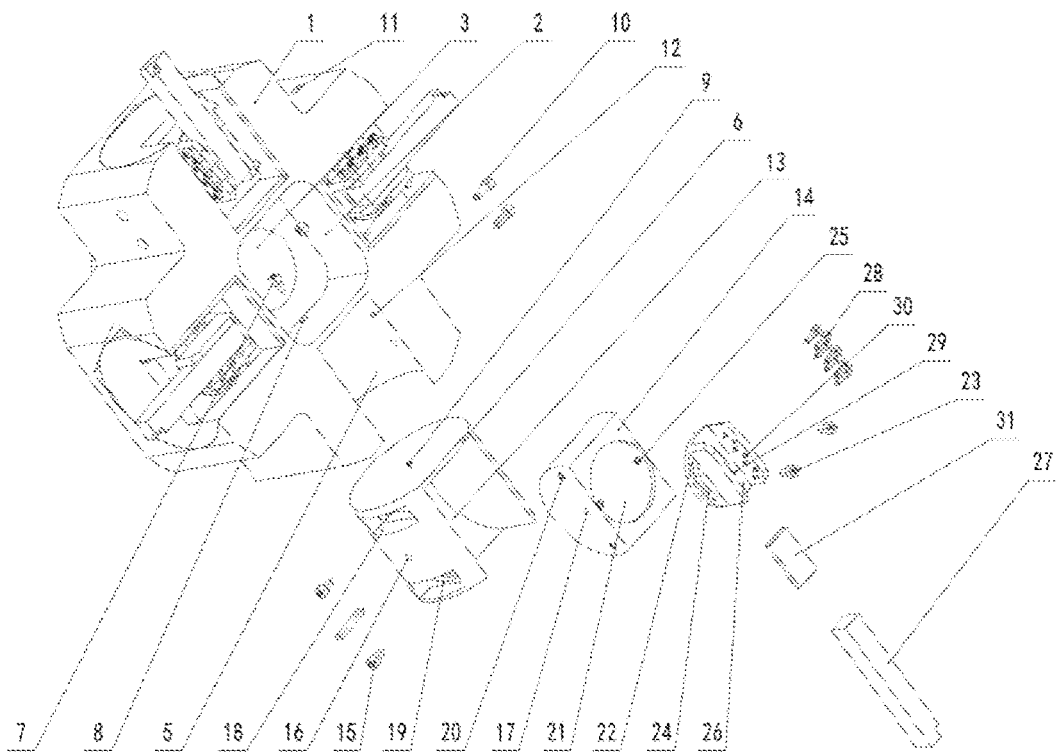
FIG. 2 is an overall exploded view of the present invention according to one or more embodiments.

This embodiment provides a milling machine fly-cutter with adjustable cutting-tool geometric angle, as shown in FIG. 1 and FIG. 2. The fly-cutter includes a fly-cutter plate body 1, an adjusting assemblies and a cutter handle 27. A plurality of the adjusting assemblies is evenly set with intervals along the circumferential direction of the fly-cutter plate body 1, and the cutter handle 27 is connected with the adjusting assemblies. The adjustments of a rake angle, a relief angle, a tool cutting edge angle, a minor cutting edge angle and a tool cutting edge inclination angle of the milling machine fly-cutter are realized by the adjusting assemblies. And the adjusting assemblies are able to adapt to the cutter handles 27 of different specifications.

Further, the adjusting assemblies include an adjusting block for rake angle and relief angle 6, an adjusting block for tool cutting edge angle and minor cutting edge angle 14 and an adjusting block for tool cutting edge inclination angle 22. The adjusting block for tool cutting edge inclination angle 22 is connected with the adjusting block for rake angle and relief angle 6 by the adjusting block for tool cutting edge angle and minor cutting edge angle 14. The adjusting block for rake angle and relief angle 6 is connected with the fly-cutter plate body 1.

Specifically, an bottom end face (taking the position of the fly-cutter in operation as the reference) of the fly-cutter plate body 1 is provided with a counterbore 2 being used for the connection for the fly-cutter plate body 1 and the milling machine spindle. A center of the fly-cutter plate body 1 is provided with a central positioning hole 3. The central positioning hole 3 is used to position the center of the fly-cutter plate body 1 mounted in the milling machine spindle, so that the center of the fly-cutter plate body 1 and the center of the milling machine spindle are along the same axle. A top end face of the fly-cutter plate body 1 is provided with a positioning groove 4, and the positioning groove 4 is used to position the fly-cutter plate body 1 horizontally when it is mounted on the milling machine spindle, so that the fly-cutter plate body 1 is parallel to the milling machine table.

In the embodiment, four combination grooves 5 are provided in the circumferential direction of the fly-cutter plate body 1. Axes of adjacent combination grooves 5 form an included angle of 90°, and axes of two adjacent combination grooves 5 set opposite to each other are along the same axle. It is understood that in other embodiments, combination grooves 5 can also be provided in other amount, depending on the number of cutter handles 27 installed on the fly-cutter plate.

Further, the combination groove 5 is provided inward along a bottom of the fly-cutter plate body 1, and a cross-section of the combination groove 5 is formed by a joint connection of a V-shaped section and a circular arc section, and the link up position of the V-shaped section and the circular arc section is in the middle.

Figure 3:
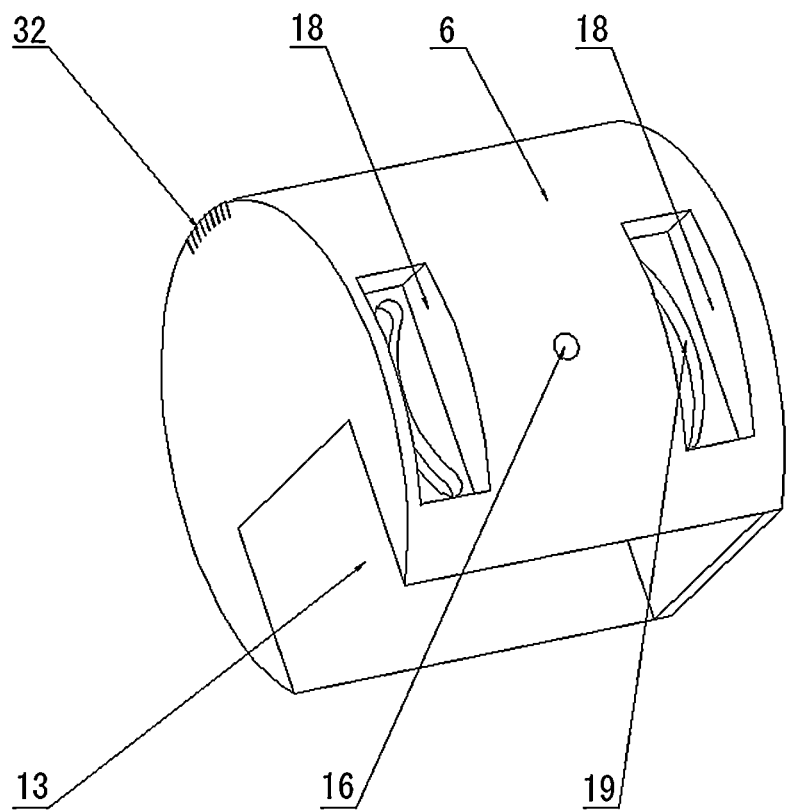
FIG. 3 is a schematic diagram of a structure of an adjusting block for rake angle and relief angle of the present invention according to one or more embodiments.

The adjusting block for rake angle and relief angle 6 is placed in the combination groove 5, as shown in FIG. 3. The adjusting block for rake angle and relief angle 6 is cylindrically shaped in order to facilitate positioning. A first mounting groove 13 is set on a first side of the adjusting block 6 for installing the adjusting block for tool cutting edge angle and minor cutting edge angle 14, and an outer wall of a second side of the adjusting block for rake angle and relief angle 6 is fitted with a surface of the V-shaped section of the combination groove 5 for central positioning.

Further, a first threaded hole 9 is provided at a first end of the adjusting block for rake angel and relief angle 6. Taking an end of the combination groove 5 located on the outer side of the fly-cutter plate body 1 as a front end face, the first threaded hole 9 is provided at a rear end face of the adjusting block for rake angle and relief angle 6. The first threaded hole 9 corresponds to a first through hole 8 provided in the counterbore 2 in the fly-cutter plate body 1, and the first through hole 8 is connected with the first threaded hole 9 by a first fastener 7.

In the embodiment, the first fastener 7 is a fitting screw, and the fitting screw cooperates with the first threaded hole 9 through the first through hole 8 to press the adjusting block for rake angle and relief angle 6 on the rear end face of the combination groove 5, realizing limited positioning of the adjusting block for rake angle and relief angle 6 along the axial direction. Therefore, axial displacement is effectively prevented for the adjusting block 6 for rake angle and relief angle, no matter in the case of rotating the adjusting block for rake angle and relief angle 6 to adjust the angle, or in the case that the milling machine fly-cutter is rotating and milling, ensuring milling accuracy of the milling machine fly-cutter.

Further, an inner wall of the side of the combination grooves 5 is provided with a second threaded hole 12, and the second threaded hole 12 is connected with a second through hole 11, and a second fastener 10 installed in the second through hole 11 limits the position of the side of the adjusting block for rake angle and relief angle 6.

In the embodiment, the second fastener 10 is a fitting screw, and the fitting screw cooperates with the second threaded hole 12 to fasten the adjusting block for rake angle and relief angle 6 in the combination groove 5 by pressing an outer cylindrical surface of the adjusting block for rake angle and relief angle 6. When the rake angle and the relief angle of the cutting tool need to be adjusted, loosen the fitting screw, rotate the adjusting block for rake angle and relief angle 6 to an appropriate angle, and then tighten the fitting screw.

The adjusting block for rake angle and relief angle 6 is able to rotate at a certain angle with the center line of its outer cylindrical surface as axis, and when rotating to a suitable angle, fasten the adjusting block for rake angle and relief angle 6 with the first fastener 7 and the second fastener 10. When the adjusting block for rake angle and relief angle 6 is rotating, the cutter handle 27 mounted on it rotates by a corresponding angle, changing the rake angle and the relief angle of the cutting tool.

Preferably, a cross-section of the first mounting groove 13 is approximately semicircular, and the adjusting block for tool cutting edge angle and minor cutting edge angle 14 is set in the first mounting groove 13 and is fastened by a third fastener 15. The adjusting block for tool cutting edge angle and minor cutting edge angle 14 is able to rotate to the desired angle on the adjusting block for rake angle and relief angle 6 on an axis of the center line of its outer arc surface, and is fastened and positioned by the third fastener 15. When the adjusting block for tool cutting edge angle and minor cutting edge angle 14 rotates, the cutter handle 27 mounted on it rotates by a corresponding angle, changing the tool cutting edge angle and the minor cutting edge angle of the cutting tool.

In the embodiment, the third fastener 15 is divided into two kinds: a locating pin and a fitting screw. The locating pin is used for the rotation of the adjusting block for tool cutting edge angle and minor cutting edge angle 14 around its center line, and the fitting screw is used for the fastening of the adjusting block for tool cutting edge angle and minor cutting edge angle 14.

As shown in FIG. 3, a side of the adjusting block for rake angle and relief angle 6 opposite to the second threaded hole 12 on the fly-cutter plate body 1 is provided with a first positioning hole 16. A second positioning hole 17 corresponding to the second positioning hole 16 is provided in a center of a side of the adjusting block for tool cutting edge angle and minor cutting edge angle 14. The positioning pin is matched with the first positioning hole 16 and the second positioning hole 17 to position the adjusting block for tool cutting edge angle and tool minor cutting edge 14.

Further, the adjusting block for rake angle and relief angle 6 is provided with mating grooves 18 on the same side of the first positioning hole 16. In the present embodiment, the mating groove 18 is provided on both sides of the first positioning hole 16. Preferably, the mating groove 18 is a square groove.

An inside surface of the mating groove 18 is provided with an adjusting groove for tool cutting edge angle and minor cutting edge angle 19, being an arc-shaped groove, and the two adjusting grooves for tool cutting edge angle and minor cutting edge angle 19 bend towards the side close to each other. The fitting screw cooperates with the third threaded hole 20 on the side of the adjusting block for tool cutting edge angle and minor cutting edge angle 14 through the adjusting groove for tool cutting edge angle and minor cutting edge angle 19, to fix the adjusting block for tool cutting edge angle and minor cutting edge angle 14 to the adjusting block for rake angle and relief angle 6. When the tool cutting edge angle and minor cutting edge angle need to be adjusted, loosen the fitting screw, rotate the adjusting block for tool cutting edge angle and minor cutting edge angle 14 to the appropriate angle, and then tighten the fitting screw.

Figure 4:
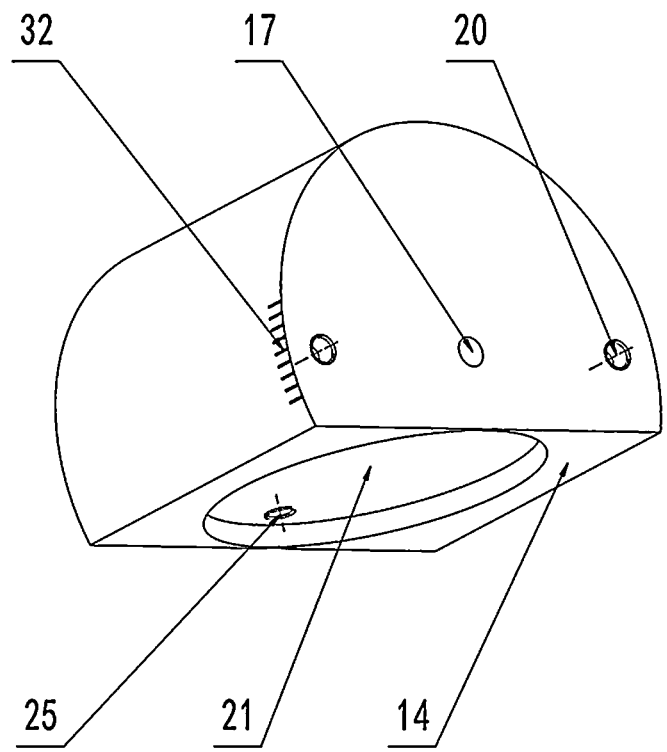
FIG. 4 is a schematic diagram of a structure of an adjusting block for tool cutting edge angle and minor cutting edge angle of the present invention according to one or more embodiments.

As shown in FIG. 4, the adjusting block for tool cutting edge angle and minor cutting edge angle 14 is of a semi-cylindrical shape, and a first side of the semi-cylindrical surface is adapted to the first mounting groove 13. A second side of the adjusting block for tool cutting edge angle and minor cutting edge angle 14 is of a rectangular plane, and a second mounting groove 21 for mounting the adjusting block for tool cutting edge inclination angle is set in the rectangular plane.

In the present embodiment, the second mounting groove 21 is a cylindrical groove. A fourth threaded hole 25 is provided in an eccentric position of the second mounting groove 21. The second positioning hole 17 and the third threaded hole 20 are provided on a first side of the end face of the adjusting block for tool cutting edge angle and minor cutting edge angle 14, and the third threaded hole 20 is provided symmetrically on both sides of the second positioning hole 17.

Figure 5:
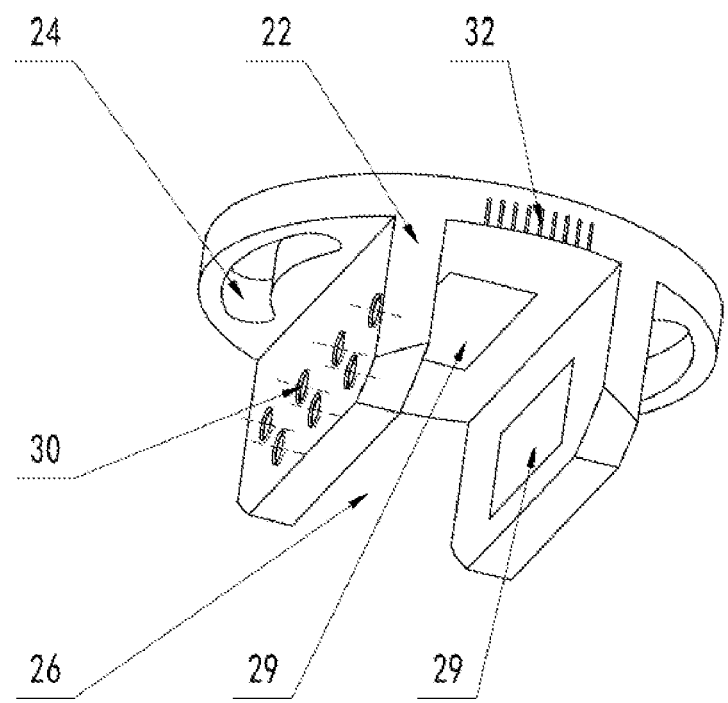
FIG. 5 is a schematic diagram of a structure of an adjusting block for tool cutting inclination angle of the present invention according to one or more embodiments.

Further, as shown in FIG. 5, the adjusting block for tool cutting edge inclination angle 22 includes a mating part and a tool mounting part, and a shape of the mating part is adapted to the second mounting groove 21. An adjusting groove for tool cutting edge inclination angle 24 is set on an edge position of the mating part. In the embodiment, two adjusting grooves for tool cutting edge inclination angle 24 are set symmetrically. The two adjusting grooves for tool cutting edge inclination angle 24 are curved grooves, and bend towards the side where the two adjusting grooves 24 are close to each other.

The adjusting groove for tool cutting edge inclination angle 24 is connected to the fourth treaded hole 25 by a fourth fastener 23. Preferably, the fourth fastener 23 is a fitting screw. The adjusting block for tool cutting edge inclination angle 22 is fastened with the adjusting block for tool cutting edge angle and tool cutting edge minor angle 14 through the fitting screw. When the tool cutting edge inclination angle needs to be adjusted, loosen the fitting screw, rotate the adjusting block for tool cutting edge inclination angle 22 to the working position, and tighten the fitting screw.

Further, the tool mounting part is composed of two symmetrically arranged mounting plates, and a tool sliding groove 26 is formed between the two mounting plates. In the present embodiment, the mounting plate is a rectangular plate and the tool sliding groove 26 is a U-shaped groove. It is understood that in other embodiments, the mounting plate may also be of other shapes.

The cutter handle 27 is mounted in the tool sliding groove 26 and is fastened by a fifth fastener 28. In the present embodiment, an upper face and a first side of the tool sliding groove 26 are provided with a magnet 29, and the cutter handle 27 is attached to the tool sliding groove 26 through the magnetic force, so as to fix and adjust the cutter handle 27 in the tool sliding groove 26. Fifth threaded holes 30 are provided on a second side of the tool sliding groove 26.

In the present embodiment, the fifth fasteners 28 are fitting screws cooperating with the fifth threaded hole 30 to press on a first side of the end face of the cutter handle 27 to fixing the cutter handle 27. When a machining range of the cutting tool needs to be adjusted, loosen the fitting screw, move the cutter handle 27 along the length direction of the tool sliding groove 26 for position adjustment, then tighten the fitting screw. In addition, when it is necessary to replace the cutter handle 27 of different specifications, loosen the fitting screw, add a corresponding adjusting cushion block 31, and fix the cutter handle 27 in the tool sliding groove 26 by tightening the fitting screw.

Further, the front end face of the adjusting block for rake angle and relief angle 6, outer circumference surface of the adjusting block for tool cutting edge angle and minor cutting edge angle 14 and the outer circumference surface of the adjusting block 22 for tool cutting edge inclination angle are provided with a graduated scale 32 to indicate the respective rotation angles of the adjusting block for rake angle and relief angle 6, the adjusting block for tool cutting edge angle and minor cutting edge angle 14 and the adjusting block for tool cutting edge inclination angle 22, so as to continuously adjust the rake angle, the relief angle, the tool cutting edge angle, the minor cutting edge angle and the tool cutting edge inclination angle of the cutting tool.

Example 2

The embodiment provides a milling machine comprising the milling machine fly-cutter described in Embodiment 1, and the milling machine fly-cutter is connected to a milling machine spindle.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

The invention claimed is:

1. A milling machine fly-cutter with adjustable cutting-tool geometric angle, comprising a fly-cutter plate body, a plurality of combination grooves are evenly set in a circumferential direction of the fly-cutter plate body, and adjusting assemblies are mounted in the plurality of the combination grooves, wherein:
the adjusting assemblies comprise an adjusting block for rake angle and relief angle, an adjusting block for tool cutting edge angle and minor cutting edge angle, and an adjusting block for tool cutting edge inclination angle; a first side of the adjusting block for tool cutting edge inclination angle is attached with a cutter handle, and a second side of the adjusting block for tool cutting edge inclination angle is connected with the adjusting block for rake angle and relief angle by the adjusting block for tool cutting edge angle and minor cutting edge angle, and
a cross-section of each of the plurality of the combination grooves is formed by connecting a V-shaped section and a circular arc segment.

2. The milling machine fly-cutter according to claim 1, wherein a first side of the adjusting block for rake angle and relief angle is fitted with the combination groove, and a second side of the adjusting block for rake angle and relief angle is set with a first mounting groove for mounting the adjusting block for tool cutting edge angle and minor cutting edge angle.

3. The milling machine fly-cutter according to claim 2, wherein a surface of a first side of the adjusting block for tool cutting edge angle and minor cutting edge angle is fitted with the first mounting groove, and a second side of the adjusting block for tool cutting edge angle and minor cutting edge angle is provided with a second mounting groove for mounting of the adjusting block for tool cutting edge inclination angle, and
a second positioning hole is set at an end of the adjusting block for tool cutting edge angle and minor cutting edge angle, and one side of the adjusting block for rake angle and relief angle has a first positioning hole corresponding to the second positioning hole.

4. The milling machine fly-cutter according to claim 3, wherein both sides of the second positioning hole are provided with threaded holes, and the threaded holes are connected with the adjusting grooves for tool cutting edge angle and minor cutting edge angle by fasteners.

5. A milling machine, comprising the milling machine fly-cutter of claim 4.

6. The milling machine fly-cutter according to claim 3, wherein a first side of the adjusting block for tool cutting edge inclination angle corresponding to the second mounting groove is provided with an adjusting groove for tool cutting edge inclination angle, and the adjusting groove for tool cutting edge inclination angle is connected with the second mounting groove by fasteners; a second side of the adjusting groove for tool cutting edge inclination angle is provided with a tool sliding groove and a plurality of magnets are arranged in the tool sliding groove.

7. A milling machine, comprising the milling machine fly-cutter of claim 6.

8. A milling machine, comprising the milling machine fly-cutter of claim 3.

9. The milling machine fly-cutter according to claim 3, wherein at least two mating grooves are provided on the side of the adjusting block for rake angle and relief angle that has the first positioning hole, and the at least two mating grooves are respectively provided at two sides of the first positioning hole and are provided with adjusting grooves for tool cutting edge angle and minor cutting edge angle.

10. A milling machine, comprising the milling machine fly-cutter of claim 9.

11. A milling machine, comprising the milling machine fly-cutter of claim 2.

12. The milling machine fly-cutter according to claim 1, wherein surfaces of the adjusting block for rake angle and relief angle, the adjustment block for tool cutting edge angle and minor cutting edge angle and the adjusting block for tool cutting edge inclination angle are all provided with graduated scales.

13. A milling machine, comprising the milling machine fly-cutter of claim 12.

14. The milling machine fly-cutter according to claim 1, wherein a bottom end face of the fly-cutter plate body is provided with a counterbore, a top end face of the fly-cutter plate body is provided with a positioning groove, and a center of the fly-cutter plate body is provided with a central positioning hole.

15. A milling machine, comprising the milling machine fly-cutter of claim 14.

16. A milling machine, comprising the milling machine fly-cutter of claim 1.

* * * * *